(12) United States Patent
Biondi et al.

(10) Patent No.: US 6,364,091 B1
(45) Date of Patent: Apr. 2, 2002

(54) CONVEYING DEVICE FOR FORMING AND CONVEYING GROUPS OF PRODUCTS

(75) Inventors: Andrea Biondi; Antonio Gamberini, both of Bologna (IT)

(73) Assignee: Azionaria Costruzioni Macchine Automatiche A.C.M.A. S.p.A., Bologna (IT)

( * ) Notice: Subject to any disclaimer, the term of this patent is extended or adjusted under 35 U.S.C. 154(b) by 0 days.

(21) Appl. No.: 09/516,308

(22) Filed: Mar. 1, 2000

(30) Foreign Application Priority Data

Mar. 4, 1999 (IT) ............................... BO99A0097

(51) Int. Cl.[7] ............................................. B65G 47/26
(52) U.S. Cl. ........................................ 198/418; 198/663
(58) Field of Search ............................. 198/407, 663, 198/662, 418; 414/798.5

(56) References Cited

U.S. PATENT DOCUMENTS 5,035,315 A * 7/1991 Fakasaki et al. ......... 198/419.2

FOREIGN PATENT DOCUMENTS

| EP | 0814037 | | 12/1997 |
|----|---------|---|---------|
| EP | 0860384 | A1 * | 8/1998 |
| EP | 0894749 | | 2/1999 |
| EP | 0894750 | | 2/1999 |

* cited by examiner

Primary Examiner—Kenneth W. Noland
(74) Attorney, Agent, or Firm—Ladas & Parry

(57) ABSTRACT

On a conveying device for forming and conveying groups of products, a screw conveyor is supplied at the input with an orderly succession of products, and has an input portion along which the products are formed into groups, and a tubular output portion for feeding the groups separately and successively to a pocket conveyor extending inside the output portion and having a number of push and lead members, each separating two adjacent pockets on the pocket conveyor.

17 Claims, 4 Drawing Sheets

CONVEYING DEVICE FOR FORMING AND CONVEYING GROUPS OF PRODUCTS

The present invention relates to a conveying device for forming and conveying groups of products.

BACKGROUND OF THE INVENTION

In the product packaging industry, screw conveyors are used of the type described, for example, in Patent Applications EP-A-0814037, EP-A-0860384, EP-A-98114561.8 and EP-A-98114556, each of which describes a screw having a number of threads or channels, each for receiving a respective product, which is fed, by rotating the screw, along a path defined by guides extending along the screw.

As described in the above patent applications, by appropriately shaping the screw and the associated guides, it is possible to turn the products over by at least 90° about at least one of their axes as they are fed along said path.

In particular, EP-A-0860384 describes a group-forming conveying device, which comprises a screw conveyor having an input end where the inlets of the channels are substantially equally spaced about the screw, and an output end where the outlets of the channels are grouped together along a peripheral portion of the screw, so that the screw conveyor receives, at the input, a substantially orderly succession of products, which, as they are fed along said path, are grouped together to form, at the output of the screw, groups, each defined by a number of adjacent products equal to the number of channels.

When used along a product feed line to feed an orderly succession of groups of products to a user machine, a screw conveyor of the above type involves several drawbacks, owing to the groups being formed at a station located at the output end of the screw, and having to be removed from the station by a transfer device, which, on account of the screw structure, is either inaccurate, in the sense of failing to provide for accurately conveying the groups, or is accurate but relatively bulky and expensive.

In fact, when each group is removed from the output end of the screw in a substantially axial direction with respect to the screw, the group can substantially only be removed, as in the case of EP-A-0860384, using a friction device (defined, for example, by a group of conveyor belts) which, by its very nature, is incapable of conveying the group accurately.

Moreover, a friction device fails to provide for controlling the products at the opposite ends of each group, which is particularly damaging when conveying products whose center of gravity may vary from one moment and one product to the next (e.g. boxes filled with particulate material capable of being variously distributed inside the boxes). In which case, the positions assumed by the respective centers of gravity may be such as to cause the products at the opposite ends of each group to topple over.

Conversely, when each group is removed from the output end of the screw in a direction substantially crosswise to the longitudinal axis of the screw, the group can be removed relatively accurately, but only using a pusher, which, to avoid interfering, immediately after removal, with the next group being formed at the output end of the screw, must have at least two degrees of freedom so as to move along an annular path, one portion of which is normally straight and substantially perpendicular to the screw axis, and another portion of which extends substantially parallel to the screw axis. Such pushers are normally fairly bulky and expensive, and result in severe inertial vibration over and above a given operating speed.

SUMMARY OF THE INVENTION

It is an object of the present invention to provide a conveying device for forming and conveying groups of products, designed to eliminate the aforementioned drawbacks.

According to the present invention, there is provided a conveying device for forming and conveying groups of products, the device comprising a first and a second conveying unit; a screw conveyor located between said two conveying units; and a first and a second transfer station connecting the screw conveyor to said first and said second conveying unit respectively; said screw conveyor being mounted for rotation in a given direction about an axis, and comprising a first portion having at least one number of helical channels varying in pitch and for receiving respective products from said first conveying unit and forming the products into groups; characterized in that said second conveying unit comprises a pocket conveyor having a number of pockets, each for receiving a respective said group and feeding the group in a given feed direction.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
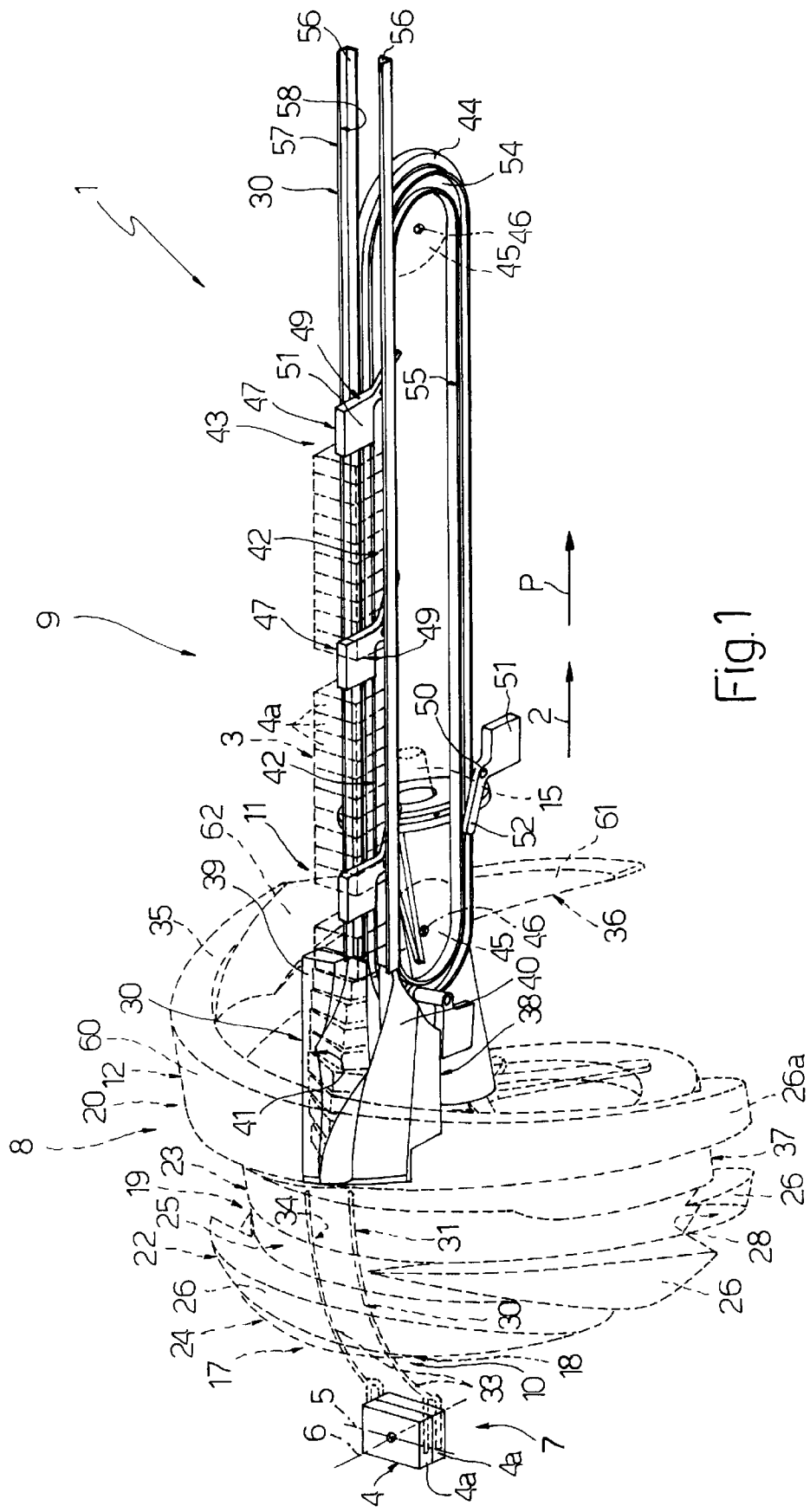
FIGS. 1, 2 and 3 show schematic views in perspective, with parts removed for clarity, of a preferred embodiment of the device according to the present invention.
Figure 2:
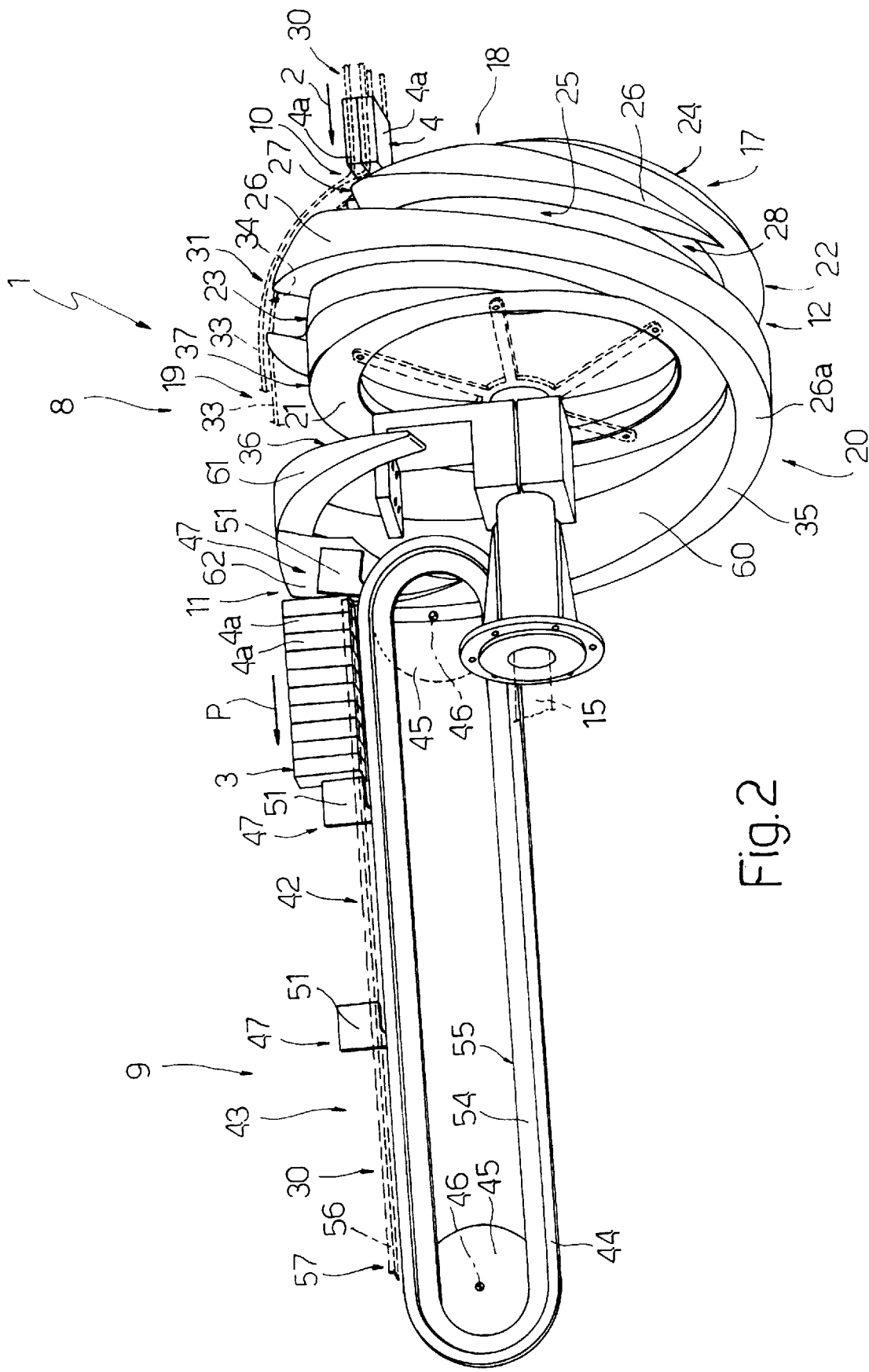
Figure 3:
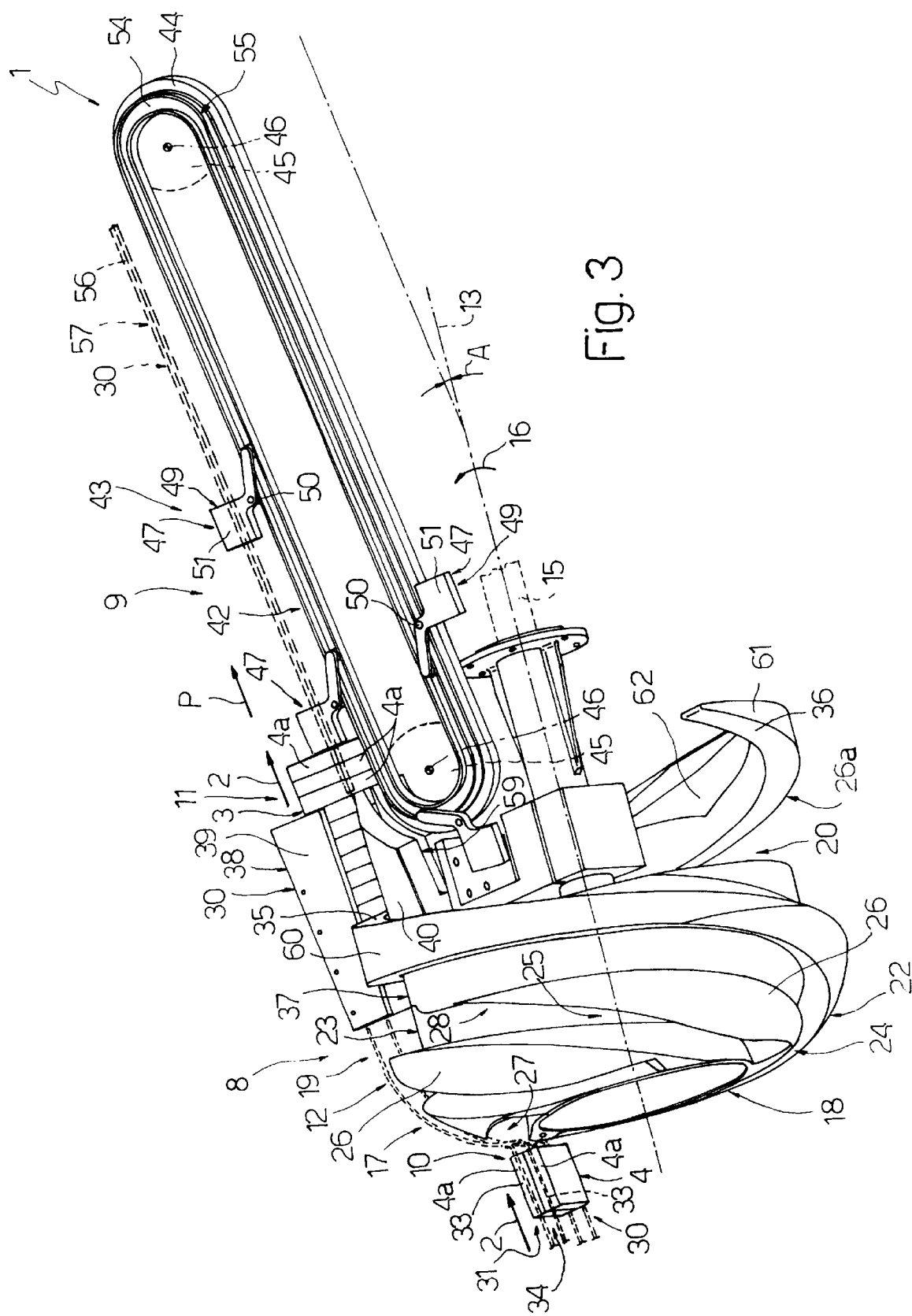
Figure 4:
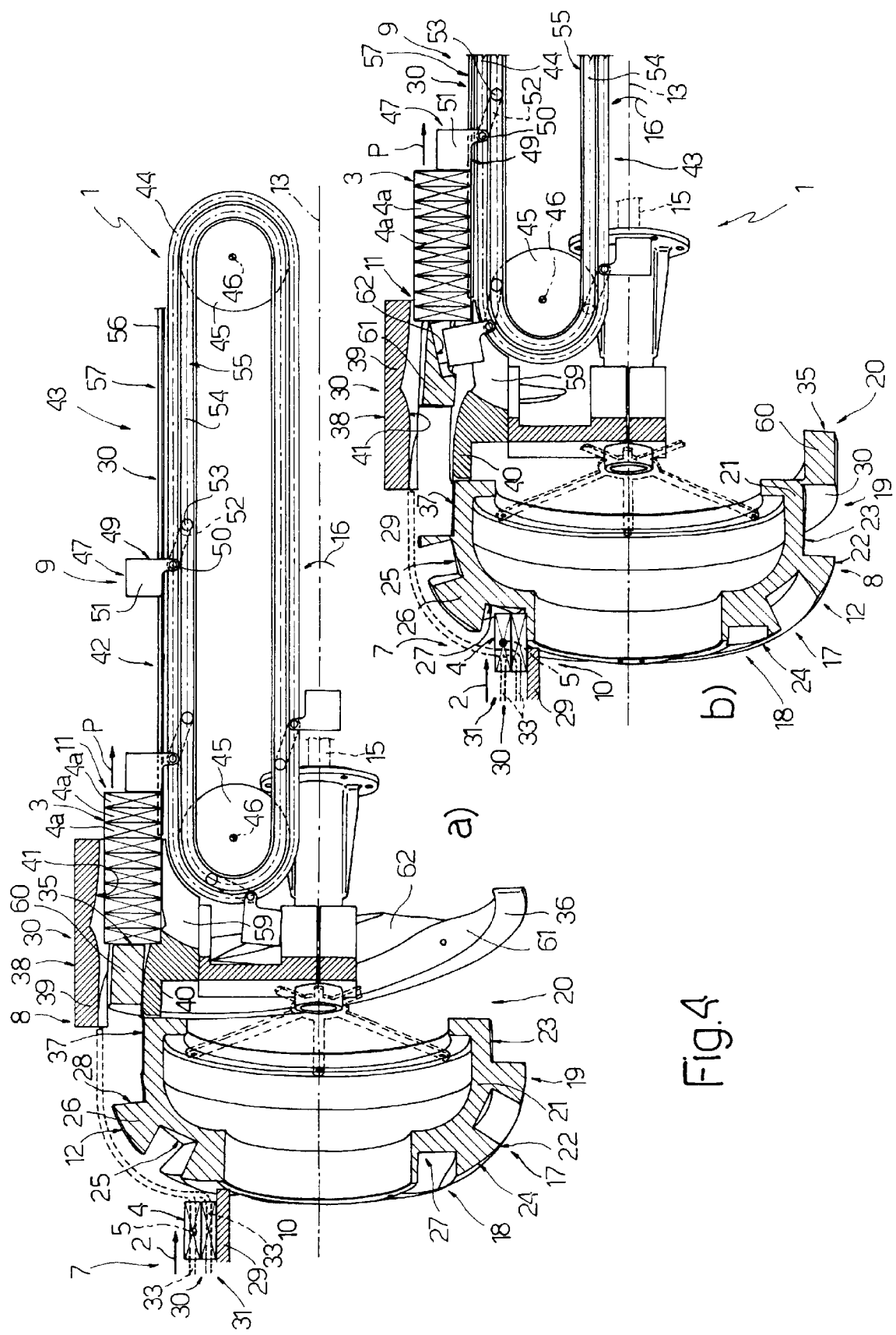
FIG. 4 shows a longitudinal section of the FIGS. 1 and 2 device.

Number 1 in FIGS. 1 to 4 indicates as a whole a conveying device for forming and conveying, along a given path P and in a given direction 2, groups 3, each comprising a given N number of products 4.

In the example shown, each product 4 comprises two boxes 4a, which are substantially in the form of a substantially rectangular-section parallelepiped, are positioned with respective major bases facing each other, and each have at least two perpendicular axes of symmetry 5 and 6.

Device 1 comprises three conveying units 7, 8, 9 arranged in series along path P and connected to one another at two transfer stations 10 and 11.

Unit 7 feeds an orderly succession of products 4 to station 10; unit 8 is located between stations 10 and 11 to form products 4 into an orderly succession of groups 3 of boxes 4a and feed groups 3 to station 11; and unit 9 receives groups 3 successively at station 11, and feeds groups 3 to a user machine not shown.

Unit 8 comprises a conveying and group-forming screw 12 extending between stations 10 and 11 and having a substantially horizontal axis 13 forming an angle A of other than zero with direction 2. A powered shaft 15 rotates screw 12 at substantially constant rotation speed about axis 13 in a given rotation direction 16, which, in the example shown, is anticlockwise in FIG. 1.

Screw 12 comprises an input portion 17 having an input end 18 and an output end 19; an output portion 20 located in series with portion 17 as of output end 19; and a core 21 coaxial with axis 13, and which may be solid or, as in the example shown, tubular, and is limited solely to input portion 17.

Portion 17 has an outer surface 22 comprising a substantially cylindrical surface 23 coaxial with axis 13 and terminating at one end at output end 19, and a substantially hemispherical surface 24, which is connected to the opposite end of surface 23 to that located at output end 19, and is defined, at input end 18, by a substantially flat, circular surface defining input end 18 itself.

On surface 22 are formed N number of variable-pitch helical channels 25 (where N equals the N number of products 4 in each group 3), each of which is separated from the two adjacent channels 25 by a helical thread 26, and has an inlet 27 located at input end 18, and an outlet 28 located at output end 19 of portion 17 of screw 12. More specifically, inlets 27 are equally spaced with a given circumferential spacing along the periphery of the circular surface defining input end 18; and outlets 28 are grouped, with a smaller circumferential spacing than inlets 27, along a limited portion of the end of cylindrical surface 23 coincident with output end 19 of portion 17.

As screw 12 rotates about axis 13, inlets 27 of channels 25 travel successively and at constant frequency through transfer station 10, to which products 4 are fed, at the same frequency and in time with inlets 27, by a conveyor belt 29 of conveying unit 7. More specifically, each product 4 is fed in direction 2 to transfer station 10 with respective boxes 4a laid flat one on top of the other, i.e. with both respective axes 5 and 6 perpendicular to direction 2, and with respective axes 5 positioned substantially horizontally.

Device 1 also comprises a guide 30 extending in direction 2 and in turn comprising an input portion 31 located between input end 18 and output end 19 of input portion 17 of screw 12.

Input portion 31 comprises two curved bars 33 located outside input portion 17 of screw 12 and defining, in between, a feed channel 34 of a width approximately equal to but no less than the size of each box 4a measured parallel to respective axis 5; while each channel 25 is of a width approximately equal to but no less than the size of each product 4 measured parallel to respective axes 6 of respective boxes 4a.

In actual use, conveyor belt 29 supplies transfer station 10 with an orderly succession of products 4, each of which is fed into inlet 27 of respective channel 25 and, at the same time, into feed channel 34 defined by bars 33. Being prevented by bars 33 from rotating with screw 12 about axis 13, each box 4a is fed along feed channel 34 by the rotation of screw 12, and is turned over about 90° about respective axis 5 as it is fed from input end 18 of portion 17 to the portion of path P extending along cylindrical surface 23 of screw 12. Since each product 4 is supplied to transfer station 10 with respective boxes 4a laid flat, boxes 4a therefore reach output end 19 of portion 17 of screw 12 in an on-edge position, i.e. with respective axes 6 parallel to direction 2, and with respective axes 5 substantially horizontal.

Outlets 28 of channels 25 being grouped together, the products 4 successively reaching output end 19 of portion 17 of screw 12 are positioned contacting one another in direction 2 to form a group 3, the last box 4a of which is positioned contacting a first lateral surface 35 of the last thread 26a; and a second lateral surface 36, opposite surface 35, of thread 26a controls from the front the forward feed of the first box 4a in the next group 3 to be formed at output end 19 of portion 17 of screw 12.

As opposed to terminating, like the other threads, at output end 19 of portion 17 of screw 12, thread 26a continues along portion 20 and projects from core 21 to define, along portion 20, a helical manifold 37, which is open radially inwards and is defined upstream (in direction 2) by surface 35, and downstream by surface 36, which is separated from facing surface 35 by a distance which, measured parallel to direction 2, is approximately equal to but no less than the length of each group 3.

The pairs of boxes 4a fed in an orderly succession to transfer station 10 are thus conveyed by portion 17 of screw 12 with a spacing which is gradually reduced to zero as boxes 4a in the same group 3 near output end 19 of portion 17. The boxes 4a arranged in line contacting one another and forming each group 3 are then fed all together along portion 20 of screw 12 by thread 26a.

To prevent the boxes 4a in groups 4 traveling along manifold 37 from falling inside portion 20 of screw 12, guide 30 comprises an intermediate portion 38 in series with input portion 31 and extending between output end 19 and transfer station 11.

Intermediate portion 38 of guide 30 is defined by two plates 39 and 40, of which, plate 39 is located outside manifold 37 and forms an extension of bars 33, and plate 40 is located inside manifold 37. Plates 39 and 40 are substantially C-shaped and arranged with their concavities facing each other to define a connecting conduit 41 having an axis substantially parallel to direction 2.

In the particular embodiment shown, conduit 41 (which may, alternatively, be straight) twists at an angle of 90° about its own axis, so that each box 4a can be rotated 90° about respective axis 5 as box 4a is fed along hemispherical surface 24 of screw 12, and can be rotated a further 90° about respective axis 6 as box 4a is fed along connecting conduit 41.

The size of angle A formed by axis 13 of screw 12 with direction 2 is so selected that surfaces 35 and 36 of thread 26a are substantially perpendicular to direction 2 at each point along conduit 41, so that, along portion 20 of screw 12, the first and last box 4a in each group 3 are positioned respectively contacting surface 36 and surface 35 of thread 26a over the whole width of the boxes measured perpendicularly to axes 5 and 6.

At transfer station 11, groups 3 are transferred successively from screw 12 to respective pockets 42 of a pocket conveyor 43 of conveying unit 9, and fed to said user machine.

Conveyor 43 comprises a chain 44, which extends partly inside output portion 20 of screw 12 and is looped about two pulleys 45 (one of which is powered) fitted to a fixed frame (not shown) to rotate about respective axes 46 crosswise to direction 2.

Conveyor 43 also comprises a number of push and lead members 47 equally spaced along chain 44. Each member 47 separates two adjacent pockets 42 of conveyor 43 and, at transfer station 11, therefore engages the rear of a respective group 3 and acts as a front support for the next group 3 following the one just extracted.

Each member 47 comprises a rocker arm 49 hinged to chain 44 to rotate, with respect to chain 44, about a hinge axis 50 parallel to axes 46.

Each rocker arm 49 comprises a first arm defined by a plate 51 substantially in the form of a right parallelepiped; and a second arm 52, the free end of which supports for rotation a tappet roller 53 engaging a track 54 formed on the face surface of a cam 55, which extends concentrically with chain 44 and controls the angular position of rocker arm 49 and, hence, respective plate 51 about axis 50.

Pocket conveyor 43 is provided with two guides 56, which define an output portion 57 of guide 30, extend parallel to direction 2 on either side of conveyor 43, and form an extension of plate 40 to define a channel 58 along which to feed groups 3 in direction 2.

To enable each member 47 to engage the rear of respective group 3 without interfering, at transfer station 11, with intermediate portion 38 of guide 30 or with thread 26a, plate 40 has an opening 59 oriented in direction 2 and of a width approximately equal to but no less than the thickness of plates 51 measured perpendicularly to direction 2, and thread 26a comprises two portions 60 and 61 defined laterally by surfaces 35 and 36, and of which portion 61 has an internally recessed end portion 62.

For each complete turn of screw 12 about axis 13, a given plate 51 therefore successively engages opening 59 in plate 40 and end portion 62 of portion 61 of thread 26a, so as firstly to contact the last box 4a in a respective group 3, and then act as a front support for the first box 4a in the next group 3 following the one just extracted.

As soon as the plate 51 in question engages the rear of respective group 3, surface 35 of thread 26a releases group 3 by converging with surface 36 at portion 61. The particular shape of portion 61 is therefore particularly advantageous in preventing group 3, on being engaged by the plate 51 in question, from being conveyed simultaneously by plate 51 and thread 26a.

At the same time, portion 61 of thread 26a is needed to enable surface 36 to retain the front of the next group 3, following the one just extracted, long enough for the first box 4a in the new group 3 to contact plate 51 in question.

At transfer station 11, the width of portion 60, measured parallel to direction 2, is determined as a function of the operating mode of pocket conveyor 43. More specifically, if conveyor 43 is operated in steps, the width of portion 60 is greater than the length of plates 51 measured parallel to direction 2, and equals the length of a plate 51 plus the distance a group 3 is fed forward by thread 26a during the stop time of conveyor 43. Conversely, if conveyor 43 is operated continuously with no intermediate stops, the width of portion 60 substantially equals the length of plates 51.

What is claimed is:

1. A conveying device for forming and conveying groups of products, the device comprising a first and a second conveying unit (7, 9); a screw conveyor (12) located between said two conveying units (7, 9); and a first and a second transfer station (10, 11) connecting the screw conveyor (12) to said first (7) and said second (9) conveying unit respectively; said screw conveyor (12) being mounted for rotation in a given direction (16) about an axis (13), and comprising a first portion (17) having at least one number of helical channels (25) varying in pitch and for receiving respective products (4) from said first conveying unit (7) and forming the products (4) into groups; wherein said second conveying unit (9) comprises a pocket conveyor (43) having a number of pockets (42), each for receiving a respective said group (3) and feeding the group (3) in a given feed direction (2); the pocket conveyor (43) comprising a number of push and lead members (47), each separating two adjacent said pockets (42) and said screw conveyor (12) comprising a second portion (20) located partly over said pocket conveyor (43) and having a helical manifold (37) for receiving the groups (3) from said first portion (17).

2. A device as claimed in claim 1, wherein said second portion (20) is tubular; said manifold (37) being open inwards; and said pocket conveyor (43) being partly inserted inside the tubular second portion (20).

3. A device as claimed in claim 2, characterized by also comprising guide means (30) in turn comprising an input portion (31) extending outside said first portion (17) of said screw conveyor (12) to define a first channel (34) for feeding said products (4) in said feed direction (2), and an output portion (57) located along said pocket conveyor (43) to define a second channel (58) for feeding said groups (3) in said feed direction (2); said output portion (57) being at least partly inserted inside said tubular second portion (20).

4. A device as claimed in claim 3, characterized in that said guide means (30) also comprise an intermediate portion (38) extending along said tubular second portion (20) and defining a conduit (41) connecting said input portion and said output portion (31, 57).

5. A device as claimed in claim 4, characterized in that said conduit (41) is defined by a first plate (39) located outside said tubular second portion (20) and forming an extension of said input portion (31), and by a second plate (40) located inside said tubular second portion (20) and forming an extension of said output portion (57).

6. A device as claimed in claim 5, characterized in that said second plate (40) comprises an opening (59) oriented in said feed direction (2); each said push and lead member (47) engaging said opening (59) immediately upstream, in said feed direction (2), from said second transfer station (11).

7. A device as claimed in claim 4, characterized in that said conduit (41) has an axis parallel to said feed direction (2), and twists 90° about said axis.

8. A device as claimed in claim 1, characterized in that said first portion (17) comprises at least one number of threads (26) defining said number of helical channels (25); said helical manifold (37) being defined along said second portion (20) by the last (26a) of said threads (26) in said rotation direction (16) of the screw conveyor (12).

9. A device as claimed in claim 8, characterized in that said last thread (26a) comprises a first and a second portion (60, 61) defined laterally by a first and a second lateral surface (35, 36); said first lateral surface (35) being located at the front in said feed direction (2) and converging with said second lateral surface (36) along said second portion (61).

10. A device as claimed in claim 2, characterized in that each said push and lead member (47) is of a given length in said feed direction (2); said first portion (60) being, at said second transfer station (11), of a width, measured in said feed direction (2), at least equal to said length.

11. A device as claimed in claim 10, characterized in that said width is greater than said length.

12. A device as claimed in claim 8, characterized in that each said push and lead member (47) is movable through a space swept by said last thread (26a) as said screw conveyor (12) rotates about said axis (13); an end portion (62) of the second portion (61) of said last thread (26a) being internally recessed to prevent interference between the last thread (26a) and said push and lead members (47) at said second transfer station (11).

13. A device as claimed in claim 1, characterized in that the axis (13) of said screw conveyor (12) forms an angle (A) of other than zero with said feed direction (2).

14. A device as claimed in claim 8, characterized in that said feed direction (2) is substantially perpendicular to said last thread (26a) at said second transfer station (11).

15. A conveying device for forming and conveying groups of products, the device comprising a first and a second conveying unit (7, 9); a screw conveyor (12) located between said two conveying units (7, 9); and a first and a second transfer station (10, 11) connecting the screw conveyor (12) to said first (7) and said second (9) conveying units respectively; said screw conveyor (12) being mounted for rotation in a given direction (16) about an axis (13), and comprising a first portion (17) having at least one number of helical channels (25) varying in pitch and for receiving respective products (4) from said first conveying unit (7) and forming the products (4) into groups; wherein said second conveying unit (9) comprises a pocket conveyor (43) having a number of pockets (42), each for receiving a respective said group (3) and feeding the group (3) in a given feed direction (2); said first portion (17) comprising at least one number or threads (26) defining said number of helical channels (25); said helical manifold (37) being defined along said second portion (20) by the last (26a) of said threads (26) in said rotation direction (16) of the screw conveyor (12).

16. A conveying device for forming and conveying groups of products, the device comprising a first and a second conveying unit (7, 9); a screw conveyor (12) located between said two conveying units (7, 9); and a first and a second transfer station (10, 11) connecting the screw conveyer (12) to said first (7) and said second (9) conveying units respectively; said screw conveyor (12) being mounted for rotation in a given direction (16) about an axis (13), and comprising a first portion (17) having at least one number of helical channels (25) varying in pitch and for receiving respective products (4) from said first conveying unit (7) and forming the products (4) into groups; wherein said second conveying unit (9) comprises a pocket conveyor (43) having a number of pockets (42), each for receiving a respective said group (3) and feeding the group (3) in a given feed direction (2); said first portion (17) comprising at least one number of threads (26) defining said number of helical channels (25); the pocket conveyor (43) comprising a number of push and lead members (47); each push and lead member (47) being movable through a space swept by a last thread (26a) as said screw conveyor (12) rotates about said axis (13); an end portion (62) of the second portion (61) of said last thread (26a) being internally recessed to prevent interference between the last thread (26a) and said push and lead members (47) at said second transfer station (11).

17. A conveying device for forming and conveying groups of products, the device comprising a first and a second conveying unit (7, 9); a screw conveyor (12) located between said two conveying units (7, 9); and a first and a second transfer station (10, 11) connecting the screw conveyer (12) to said first (7) and said second (9) conveying units respectively; said screw conveyor (12) being mounted for rotation in a given direction (16) about an axis (13), and comprising a first portion (17) having at least one number of helical channels (25) varying in pitch and for receiving respective products (4) from said first conveying unit (7) and forming the products (4) into groups; wherein said second conveying unit (9) comprises a pocket conveyor (43) having a number of pockets (42), each for receiving a respective said group (3) and feeding the group (3) in a given feed direction (2); the axis (13) of said screw conveyor (12) forming an angle (A) of other than zero with said feed direction (2).

* * * * *